June 1, 1954 T. H. JOHNS 2,679,668
APPARATUS FOR REMOVING STICKERS FROM PIG MOLDS
Filed Dec. 28, 1951 2 Sheets-Sheet 1

INVENTOR.
THOMAS H. JOHNS
BY Donald G. Dalton
HIS ATTORNEY

June 1, 1954 T. H. JOHNS 2,679,668
APPARATUS FOR REMOVING STICKERS FROM PIG MOLDS
Filed Dec. 28, 1951 2 Sheets-Sheet 2

INVENTOR.
THOMAS H. JOHNS
BY Donald G. Dalton
HIS ATTORNEY

Patented June 1, 1954

2,679,668

UNITED STATES PATENT OFFICE 2,679,668

APPARATUS FOR REMOVING STICKERS FROM PIG MOLDS

Thomas H. Johns, Pittsburgh, Pa.

Application December 28, 1951, Serial No. 263,854

1 Claim. (Cl. 22—62)

This invention relates to provisions for the removal from the molds of a pig-casting machine, of the occasional pig which adheres to its mold, instead of falling therefrom.

The molds of a conventional pig-casting machine are inverted as the conveyor chains on which they are mounted travel around the drive sprockets at the end of the upper run of the chains. The great majority of the pigs thereupon fall freely into a discharge chute by reason of their shrinkage resulting from cooling. Occasionally, however, a pig will stick in its mold and must be dislodged mechanically. Automatic hammer mechanism effective to strike a blow on the bottom of each mold is usually employed for this purpose. Such mechanism does not discriminate between a mold containing a sticking pig and the empty molds which constitute by far the large majority. Hence a great deal of unnecessary hammering takes place which is injurious to the molds and shortens their useful life.

I have invented a novel apparatus for removing sticking pigs whereby the aforementioned objection to prior devices is wholly overcome. In a preferred practice, I cause a magnetic field to approach each mold closely and then move away from it gradually. The field is designed and disposed to exert a powerful attraction on any pig which sticks in its mold, sufficient to overcome the tendency to adhere and positively pull the pig free from the mold. The apparatus includes a wheel journaled below the lower run of the conveyor chains and provided with a plurality of permanent magnets adapted to contact the exposed faces of pigs which stick in their molds after the latter have been inverted. The wheel is driven by any convenient means, preferably by a sprocket engaging one of the conveyor chains. Stripper skids are located appropriately to separate from the magnets the pigs pulled from the molds. The magnets, of course, have little or no effect on the empty molds. In the case of the pigs which stick, furthermore, the removal force is applied directly thereto instead of through the mold as heretofore.

A complete understanding of the invention may be obtained from the following detailed description and explanation of the present preferred embodiment illustrated in the accompanying drawings. In the drawings, Figure 1 is a partial plan view showing the invention installed below the rails on which the lower runs of the conveyor chains travel, the chains being omitted and the molds indicated only in outline, for the sake of clearness;

Figure 1:
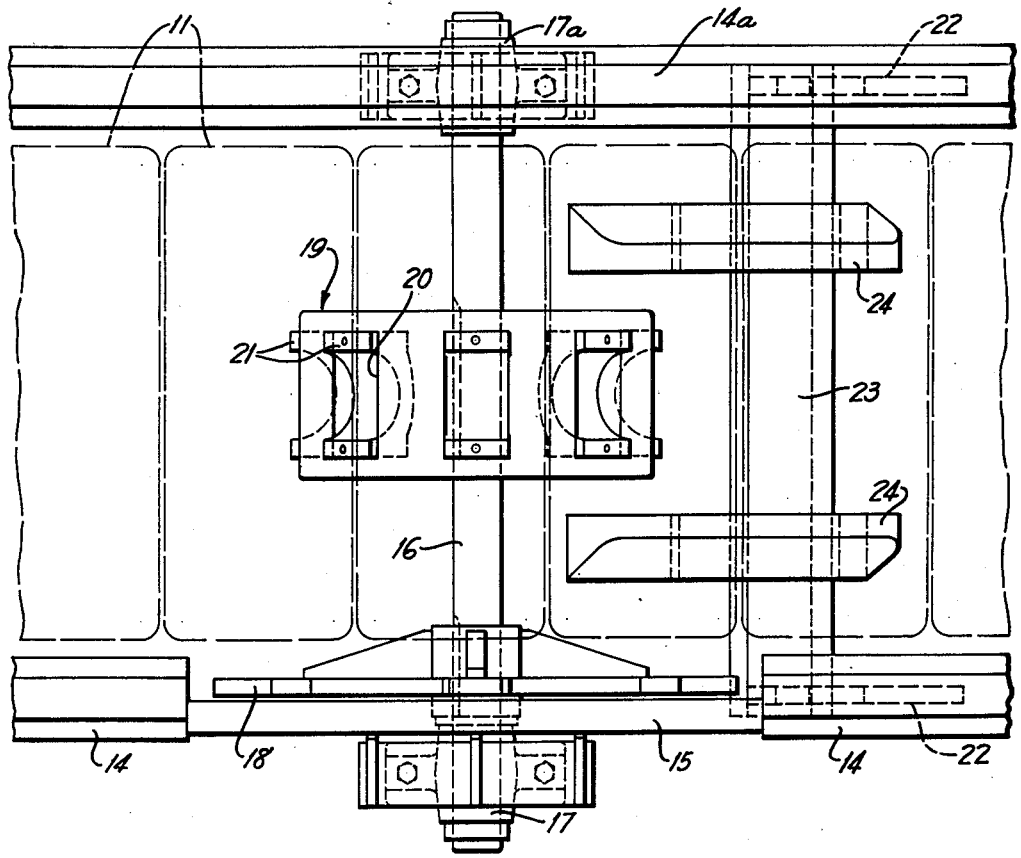
Figure 2:
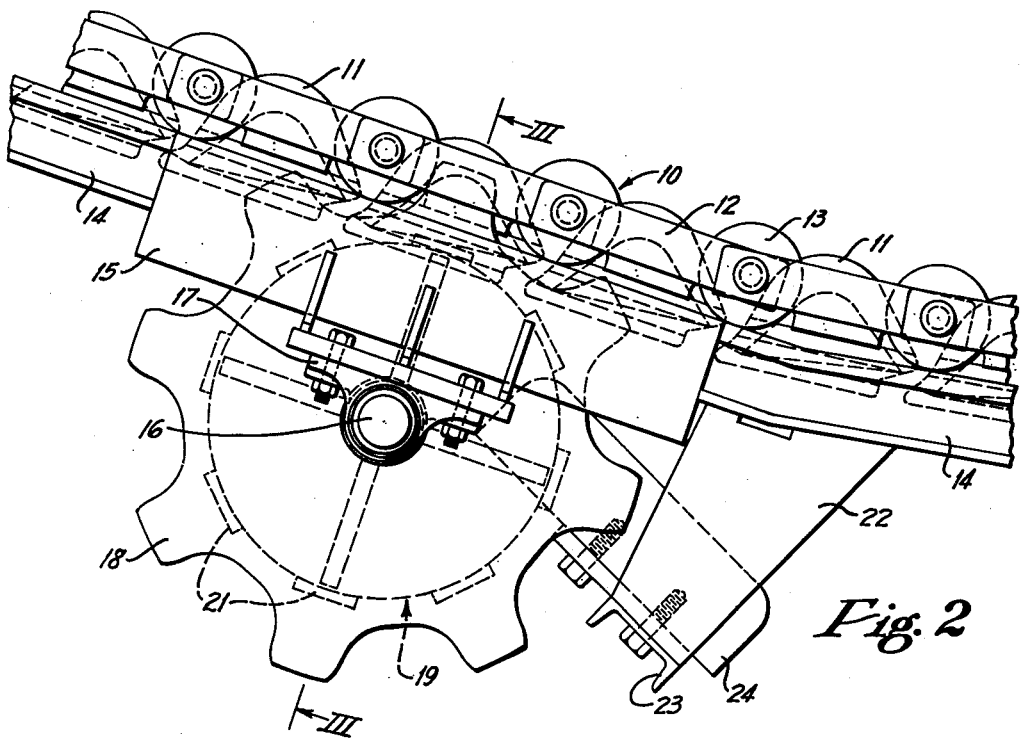
Figure 2 is a side elevation.
Figure 3:
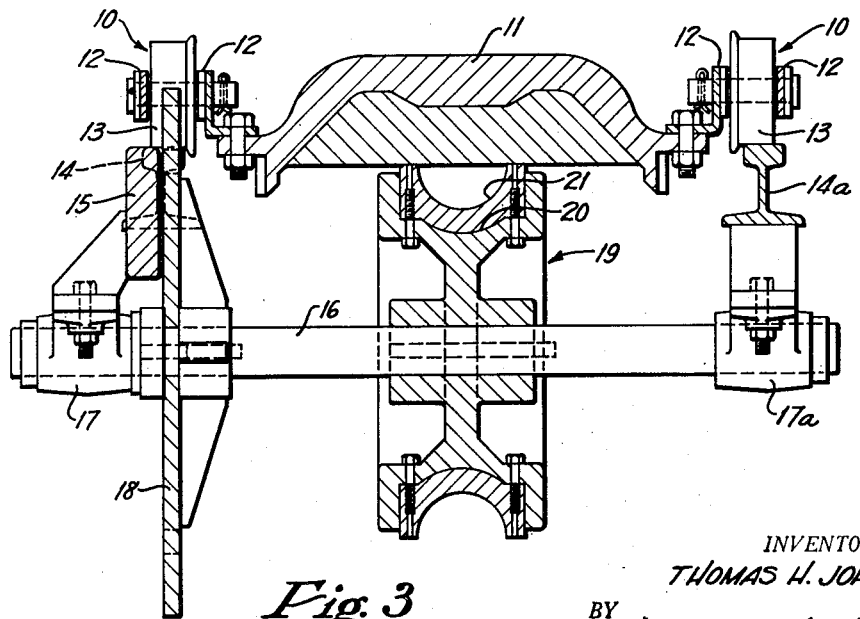
Figure 3 is a transverse section taken on the plane of line III—III of Figure 2.

Referring now in detail to the drawings, a pair of spaced conveyor chains 10 support a series of pig molds 11 therebetween. The chains include links 12 pivoted together, to which the molds are secured as shown in Figure 3, and rollers 13 journaled on the pins by which adjacent links are pivotally connected. The rollers travel on spaced rails 14 and 14a carried on any suitable supports (not shown). The construction described so far is conventional in the design of modern pig machines.

Rail 14 has a portion removed therefrom leaving a gap therein which is bridged by a bar 15 secured to the spaced rail ends in any suitable manner. A shaft 16 is journaled below the rails in a bearing 17 depending from bar 15 and a bearing 17a secured to the bottom of rail 14a. A sprocket 18 is keyed on shaft 16 and is located so its teeth will be engaged successively by the rollers 13 of one chain 10. Thus the sprocket is driven in timed relation with the travel of the chains. As shown in Figure 3, the sprocket is positioned in the same vertical plane as the rollers of chain 10.

A magnet wheel 19 of non-magnetic metal is keyed on shaft 16 between rails 14 and 14a. The wheel has a plurality of radial pockets 20, one for each tooth of sprocket 18. A permanent horseshoe magnet 21 is secured in each pocket 20 with its poles extending outwardly beyond the periphery of the wheel. The wheel 19 is so disposed relative to sprocket 18 that magnets 21 will be alined with successive molds 11 as they pass over shaft 16. Wheel 19, furthermore, is dimensioned so that one of the magnets will come in contact with any pig which remains stuck in its mold and will exert a sufficient downward pull thereon to dislodge it as the magnet starts to move away from the mold by continued rotation of the wheel while the mold travels along rails 14 and 14a.

Brackets 22 depending from the rails support a cross beam 23 on which spaced stripper skids 24 of non-magnetic metal are mounted. As a pig pulled from its mold by one of the magnets travels therewith around shaft 16 on wheel 19, its ends strike the skids and it is thereby detached from the magnet. The pig then slides down the skids and into a chute (not shown). Molds which do not have a pig sticking therein are subject to but little attraction by the magnets because of the distance between them.

It will be apparent that the invention is characterized by numerous advantages. The apparatus is simple, inexpensive and requires no attention in operation except routine lubrication. Permanent magnets are readily available with sufficient strength to dislodge even the most stubbornly sticking pig. Thus the apparatus is highly effective and always operative. Driving the magnet wheel by one of the conveyor chains obviates a separate power source and constantly insures proper synchronism between the magnets and molds. The force necessary to remove a sticking pig is applied directly thereto and the molds are spared unnecessary shock and abuse.

Although I have disclosed only a preferred practice and embodiment, I intend to cover as well any changes or modifications therein falling within the spirit of the invention and the scope of the appended claim.

I claim:

In an apparatus for removing sticking pigs from a series of molds carried by conveyor chains traveling along spaced rails, one of said rails being interrupted for a limited distance forming a gap at a point on the lower run of the chains, a bar bridging said gap, alined bearings depending from said bar and from the other of said rails, respectively, a shaft journaled in said bearings and extending transversely of said rails, a magnet wheel on said shaft having circumferentially spaced magnets coacting, respectively, with said molds, and a sprocket secured to said shaft and located thereon substantially in the plane of said interrupted rail whereby, on travel of said chains, the sprocket teeth are drivingly engaged by the chain traversing the interrupted rail.

References Cited in the file of this patent

UNITED STATES PATENTS

| Number | Name | Date |
| --- | --- | --- |
| 596,494 | Garretson | Jan. 4, 1898 |
| 620,494 | Ramsay | Feb. 28, 1899 |
| 629,480 | Uehling et al. | July 25, 1899 |
| 657,071 | Patterson | Aug. 28, 1900 |
| 706,841 | Meehan | Aug. 12, 1902 |
| 1,911,228 | Gathmann | May 30, 1933 |
| 1,997,405 | Henry | Apr. 9, 1935 |
| 2,505,415 | Lukancic | Apr. 25, 1950 |